United States Patent [19]

Kawamura

[11] Patent Number: 4,718,235
[45] Date of Patent: Jan. 12, 1988

[54] TURBO COMPOUND INTERNAL COMBUSTION ENGINE

[75] Inventor: Hideo Kawamura, Fujisawa, Japan

[73] Assignee: Isuzu Motors, Ltd., Japan

[21] Appl. No.: 920,457

[22] Filed: Oct. 20, 1986

[30] Foreign Application Priority Data

Oct. 24, 1985 [JP] Japan ................................ 60-238381

[51] Int. Cl.⁴ .............................................. F02G 3/00
[52] U.S. Cl. ........................................ 60/624; 60/715
[58] Field of Search ........................ 60/615, 624, 715

[56] References Cited

U.S. PATENT DOCUMENTS 4,008,572 2/1977 Woollenweber, Jr. ............ 60/615 X
4,391,098 7/1983 Kosuge .............................. 60/624 X Primary Examiner—Stephen F. Husar
Attorney, Agent, or Firm—John E. Toupal; Harold G. Jarcho

[57] ABSTRACT

An internal combustion engine exhaust energy recovery apparatus including a turbine housing retaining a recovery turbine disc and defining a recovery inlet, a recovery exhaust port for discharging exhaust gases, a turbine chamber enclosing the turbine disc, and a convoluted recovery passage extending between the inlet and a periphery of the turbine disc. Disposed in the housing is a partition that separates the convoluted passage into first and second passages each providing communication between the inlet and the periphery of the turbine disc. A recovery valve is disposed in the first passage and is operable to control the flow of exhaust gases received at the inlet from a supercharger.

2 Claims, 3 Drawing Figures

TURBO COMPOUND INTERNAL COMBUSTION ENGINE

BACKGROUND OF THE INVENTION

The present invention relates generally to an internal combustion engine and, more particularly, to a turbo-compound internal combustion engine.

For turbo-superchargers commonly used with internal combustion engines, the flow rate of exhaust air at low engine speed generally is insufficient resulting in less than satisfactory performance. More specifically, the ratio $P_2/P_1$ between inlet pressure and outlet pressure with respect to the flow rate of exhaust air to the turbo-supercharger varies as shown in FIG. 3. Since the efficiency of a supercharger's turbine is expressed by $n=1-(P_1/P_2)^{K-1/K}$, the ratio of inlet pressure and outlet pressure substantially affects efficiency with increased inlet pressure providing increased turbine efficiency. Accordingly, for internal combustion engines exhibiting large variations in normal exhaust gas flow rates, it is very difficult to effectively utilize exhaust energy for intake supercharging when using a single turbine.

Laid-Open Japanese Utility Model application No. 114844/1983 discloses an arrangement wherein a turbo-supercharger turbine disc possesses both a low-speed disc and a high-speed disc disposed internally and externally, respectively. A partitioning wall in the turbine housing provides separate passages to each of the high-speed and low-speed turbine discs and a valve interrupts flow to the high-speed disc when the flow rate of exhaust gases is small. An improvement of that device is disclosed in U.S. patent application Ser. No. 920,456, entitled "Turbo-Supercharger for Internal Combustion Engine" filed concurrently with this application, and having a common assignee. Although the above noted structural arrangements improve turbo-supercharger efficiency, they are not readily applicable to a turbo-compound internal combustion engine.

In the turbo-compound internal combustion engine wherein exhaust gases from a turbo-supercharger are introduced into a recovery turbine coupled to a crank shaft, the pressure ratio between the turbo-supercharger and the recovery turbine is a particularly important factor. As shown in FIG. 3, with a pressure ratio A in the turbo-supercharger, the pressure ratio B of the recovery turbine also will be maintained sufficiently high. However, a reduced flow rate of exhaust gases produces a lower pressure ratio C in the turbo-supercharger and a still lower pressure ratio D in the recovery turbine. Thus, in order to increase the efficiency of the recovery turbine, it is important to shift the recovery turbine pressure ratio from the value D to the value E.

The object of the invention, therefore, is to provide a turbo-compound internal combustion engine in which the pressure ratio and the efficiency of the recovery turbine is increased during low rotational speed operation of the engine.

SUMMARY OF THE INVENTION

The invention is an internal combustion engine exhaust energy recovery apparatus including a drive shaft; a recovery turbine disc mounted for rotation with the drive shaft; a power transmission mechanism coupled to and driven by the drive shaft and adapted to transmit power therefrom to a crank shaft of an internal combustion engine driven vehicle; a recovery turbine housing defining a recovery inlet for connection to receive engine exhaust gases, a recovery exhaust port for discharging exhaust gases, a recovery turbine chamber enclosing the recovery turbine disc, and a convoluted recovery passage extending between the recovery inlet and a periphery of the recovery turbine disc; a recovery partition disposed in the recovery housing and separating the convoluted recovery passage into first and second recovery passages each providing communication between the recovery inlet and the periphery of the recovery turbine disc; and a recovery valve disposed in the first recovery passage and operable to control the flow of exhaust gases therethrough. The provision of separated first and second recovery passages and an exhaust gas flow controlling valve in one of the passages significantly increases the efficiency of the recovery turbine.

According to one feature, the apparatus includes a recovery sensor for sensing the pressure at the recovery inlet, and an electrical recovery control coupled to the recovery valve and the recovery sensor and operative to control the recovery valve in response to the pressure at the recovery inlet. Control of the valve in response to inlet pressure provides the desired increased efficiency.

According to another feature, the invention includes an engine turbo-supercharger means comprising a blower adapted to supply intake air to the engine, and drive means driven by the exhaust gases and coupled to so as to drive the blower. This feature provides the increased efficiency turbo-compound engine with turbo-supercharger performance characteristics.

According to further features of the invention, the drive means comprises a supercharger turbine disc driven by the exhaust gases and coupled to the blower; a supercharger turbine housing defining a supercharger inlet for connection to receive the engine exhaust gases, a supercharger exhaust port for discharging exhaust gases, a supercharger turbine chamber enclosing the supercharger turbine disc, and a convoluted supercharger passage extending between the supercharger inlet and a periphery of the supercharger turbine disc; a supercharger partition disposed in the supercharger housing and separating the convoluted supercharger passage into first and second supercharger passages each providing communication between the supercharger inlet and the periphery of the supercharger turbine disc; and a supercharger valve disposed in the first supercharger passage and operable to control the flow of exhaust gases therethrough. This arrangement improves the efficiency of the turbo-supercharger, According to an additional feature of the invention, the turbo-supercharger means is connected to the recovery inlet so as to transmit thereto exhaust gases received from an exhaust manifold of the internal combustion engine. Location of the turbo-supercharger between the recovery turbine and the exhaust manifold establishes a preferred flow path for exhaust gases.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
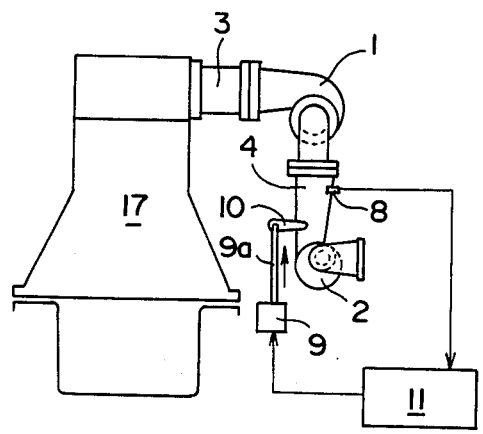
FIG. 1 is a schematic view of a turbo-compound internal combustion engine according to the present invention.

As shown in FIG. 1, a turbo-supercharger 1 is connected to an exhaust pipe 3 of an internal combustion engine 17. A turbine in the supercharger 1 is driven by exhaust gases and in turn drives a blower to effect intake supercharging. More detailed descriptions of the turbo-supercharger 1 appear in the aforesaid Japanese and United States patent applications.

The exhaust air discharged from the turbo-supercharger 1 is introduced into an inlet portion 4 of a recovery turbine housing 2. Defined by the housing portion 4 is a convoluted passage including scroll-shaped chambers 13a and 13b communicating with the periphery of a recovery turbine blade 12. Exhaust gases impinge upon the turbine blade 12 to produce rotation thereof. A shaft 18 is fixed for rotation with the blade 12. Spent exhaust gases are discharged through an exhaust port 19.

Located within the housing scroll portion 4 is a partitioning plate 6 which separates the convoluted passage into first and second scroll-shaped passages a and b. The first passage a can be opened or closed by a recovery valve 7 disposed therein. Coupled to a shaft 21 on the valve 7 is a lever 10 and rod 9a driven by an electromagnetic actuator 9 shown in FIG. 1. An electronic controller 11 connected to the actuator 9 receives on electric signal from a pressure sensor 8 provided at the inlet of the housing portion 4. When inlet pressure decreases below a predetermined value, the electromagnetic actuator 9 is excited by the output of the electronic controller 11 to close the valve 7 and the first scroll passage a.

Driven by the shaft 18 on the recovery turbine 12 is an electrical generator 14. A rotor 15 is coupled for rotation with the shaft 18 and is magnetically coupled with a stator 16. Electric power generated by the generator 14 is supplied to an electric motor (not shown) connected to a crank shaft of the engine 17. It is to be noted, however, that the generator 14 could be replaced by a gear transmission mechanism coupled to the crank shaft of the engine 17. It is to be further noted that the positions of the recovery turbine 12 and the turbo-supercharger 1 could be reversed with the recovery turbine connected to the exhaust pipe 3 and the turbo-supercharger 1 connected to the exhaust 19.

OPERATION

Figure 2:
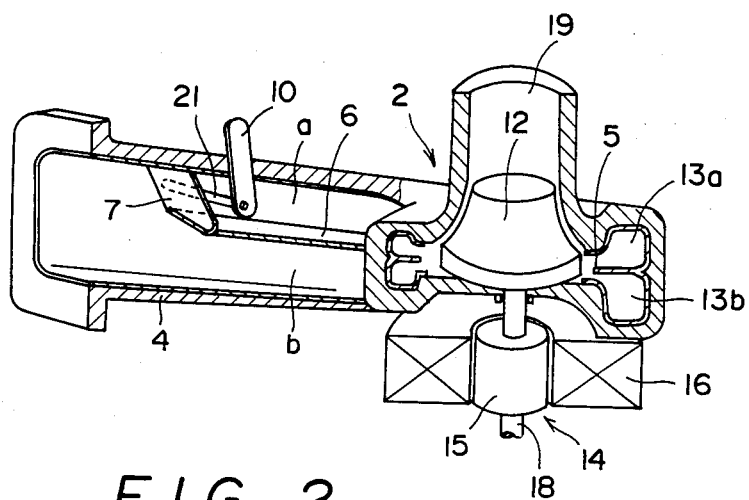
FIG. 2 is a side view in cross-section of a recovery turbine in the turbo-compound internal combustion engine.
Figure 3:
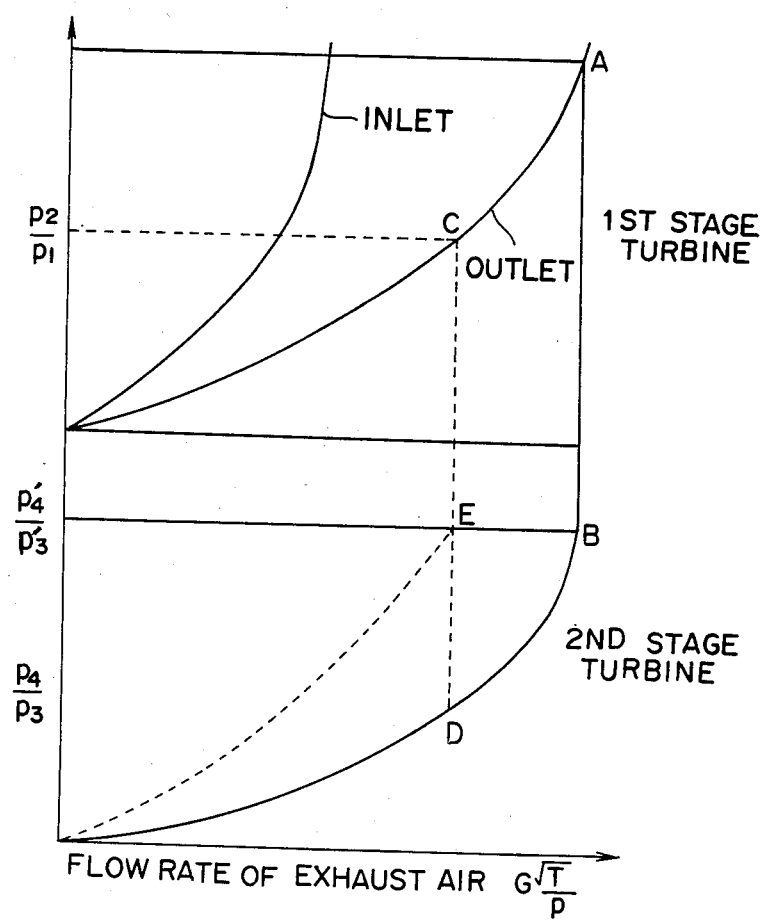
FIG. 3 is a diagram illustrating operating characteristics of the engine.

With an increase in the rotational speed (r.p.m.) of the engine 17, the flow rate of exhaust gases also increase. When the pressure detected by the pressure sensor 8 exceeds a predetermined value, the rod 9a of the electromagnetic actuator 9 is returned by a spring (not shown) and the lever 10 is pivotally moved counterclockwise in FIG. 2 to open the valve 7. Accordingly, exhaust gases flow through both the first and second passages a and b, respectively, into the scroll chambers 13a and 13b. Accordingly, the rotational speed of the turbine blade 12 and the torque produced thereby both increase. Correspondingly, the inlet pressure to the recovery turbine 12 increases and the pressure ratio P4/P3 approaches the level B in FIG. 3. Conversely, when the rotational speed of the engine 17 is low and the flow rate of exhaust gases small, the valve 7 is closed to close the first passage a. The flow of exhaust gases therefore is limited to the second scroll passage b whereby the inlet pressure is increased to maintain a relatively high pressure ratio P4/P3.

With an increasing pressure ratio in the recovery turbine 12, the exhaust pressure of the turbo-supercharger 1 also increases. That is, the pressure ratio increases from P4/P3 to P4'/P3', and the inlet pressure of the recovery turbine 12 becomes $P1=(P1/P2)\times P4'$. Accordingly, the output work of the engine increases with increased exhaust pressure. The increases in the amount of work and increases in efficiency of the recovery turbine 12 have a reciprocal relationship. Therefore, the turbo-supercharger 1 preferably employs a construction similar to that of the recovery turbine 12 with a flow control valve disposed in one of two separated input passages. Such a construction is shown in the aforesaid patent applications.

Obviously, many modifications and variations of the present invention are possible in light of the above teachings. It is to be understood, therefore, that the invention can be practiced otherwise than as specifically described.

What is claimed:

1. An internal combustion engine exhaust energy recovery apparatus comprising:
    an engine supercharger means comprising a blower adapted to receive exhaust gases from an engine and to supply intake air thereto;
    a recovery turbine disc adapted for rotation with a drive shaft coupled to the engine;
    a recovery turbine housing defining a recovery inlet connected to receive engine exhaust gases discharged by said supercharger means; a recovery exhaust port for discharging exhaust gases, a recovery turbine chamber enclosing said recovery turbine disc, and a convoluted recovery passage extending between said recovery inlet and a periphery of said recovery turbine disc;
    recovery partition means disposed in said recovery housing and separating said convoluted recovery passage into first and second recovery passages each providing communication between said recovery inlet and said periphery of said recovery turbine disc; and
    a recovery valve disposed in said first recovery passage and operable between an open position allowing exhaust gas flow through said first recovery passage and a closed position producing diversion of exhaust gas into said second recovery passage.

2. An apparatus according to claim 1 including recovery sensor means for sensing the pressure at said recovery inlet, and electrical recovery control means coupled to said recovery valve and said recovery sensor means and operative to control said recovery valve in response to the pressure at said recovery inlet.

* * * * *